(12) United States Patent
Kim et al.

(10) Patent No.: US 7,449,845 B2
(45) Date of Patent: Nov. 11, 2008

(54) BACKLIGHT ASSEMBLY AND DISPLAY APPARATUS HAVING THE SAME

(75) Inventors: Heu-Gon Kim, Suwon-si (KR); Sang-Hyuck Yoon, Seoul (KR); Si-Joon Song, Yongin-si (KR); Jong-Dae Park, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 394 days.

(21) Appl. No.: 10/948,535

(22) Filed: Sep. 22, 2004

(65) Prior Publication Data

US 2005/0111225 A1   May 26, 2005

(30) Foreign Application Priority Data

Oct. 20, 2003   (KR) .................. 10-2003-0073106

(51) Int. Cl.
*H05B 41/36* (2006.01)
(52) U.S. Cl. .................. 315/307; 315/119; 315/291
(58) Field of Classification Search ........... 315/119, 315/291, 307; 356/435; 250/205, 239
See application file for complete search history.

(56) References Cited

U.S. PATENT DOCUMENTS

| 5,412,222 | A | * | 5/1995 | Hejazi | 250/588 |
| 6,534,756 | B1 | * | 3/2003 | Grimbergen | 250/205 |
| 6,909,238 | B2 | * | 6/2005 | Huang | 315/119 |

FOREIGN PATENT DOCUMENTS

JP   2002-131746   5/2002

OTHER PUBLICATIONS

English Abstract, Publication No. JP 2002-131746.

* cited by examiner

*Primary Examiner*—Gregory J. Toatley, Jr.
*Assistant Examiner*—Juan D Valentin
(74) *Attorney, Agent, or Firm*—MacPherson Kwok Chen & Heid LLP (57) ABSTRACT

Backlight assembly and the display device using the same are disclosed. Backlight assembly comprises a container and a detector. The container holds a light and electromagnetic field generating source and a sampling portion for passing the light and/or electromagnetic field. The detector is located on the outer space of the container and has an electromagnetic field reactive sensing unit and a body to support the sensing unit. Therefore, the backlight of the present invention can protect lamp from the successive malfunctioning and prevent fire.

28 Claims, 9 Drawing Sheets

BACKLIGHT ASSEMBLY AND DISPLAY APPARATUS HAVING THE SAME

CROSS-REFERENCE OF RELATED APPLICATIONS

The present application claims priority from Korean Patent Application No. 2003-73106, filed on Oct. 20, 2003, the disclosure of which is hereby incorporated herein by reference in its entirety.

BACKGROUND OF THE INVENTION

1. Field of the Invention

The present invention relates to liquid crystal devices (LCDs) and, in particular, to LCDs with backlight assemblies.

2. Description of the Related Art

Generally, a display device converts electronic data into display information. The majority of display devices are either CRT (Cathode Ray Tube) display devices or flat display devices such as an LCD (Liquid Crystal Display), an organic electroluminescence display, or a PDP (Plasma Display Panel).

Currently, there is large market for flat display devices, which are typically smaller in both size and weight than the CRT type display device. One important type of flat display device is the LCD, which is characterized by high and uniform luminance, high efficiency, long lifetime, thin thickness, light weight, and low cost.

An LCD is operated by twisting an array of liquid crystal molecules in accordance with the occupied electric current to each molecule. A light, received from a light source of a backlight, passes through the array of liquid crystal molecules to display the image.

As to the light source, only one light source, for example, a lamp, is needed for small or middle-sized LCDs. However, as the size of LCD displays increases, such as with larger computer and television screens, more light sources, e.g., twenty light sources, are needed. To minimize the physical size of the light sources, the plurality of lamps is typically formed into an array in which each lamp is connected to one individual electrical source. If each of the plurality of light sources shares one or two electrical sources, i.e., connected to each other in parallel, the cost of manufacturing and the size of LCD can both be reduced. However, if one of the lamps malfunctions, the rest of the lamps may overcharge, resulting in additional malfunctioning lamps or causing fire of the whole LCD product.

Accordingly, there is a need for an LCD display system with a backlight that overcomes the disadvantages of conventional systems as discussed above.

BRIEF SUMMARY OF THE INVENTION

According to one aspect of the present invention, a backlight assembly for an LCD display device comprises a container and a detector. In one embodiment, the container holds a plurality of light and electromagnetic field generating light sources and includes a sampling portion that the electromagnetic field passes through. In another embodiment, the container holds a plurality of light generating light sources and includes a sampling portion that the light passes through. The detector comprises a sensor unit, which is located on the outer surface corresponding to the sampling portion so as to generate a sensing signal, and a body to support the sensor unit.

In another embodiment, a backlight assembly for an LCD display device comprises a container and a detector. The container has an energy source and a sampling portion which passes the energy. The detector has a sensor unit overlapped with the sampling portion and a body disposed on the outer space of the container to support the sensor unit. The sensor unit generates a sensing signal dependent on the amount of energy detected.

According to another embodiment of the invention, the container holds a plurality of light and electromagnetic field generating light sources and includes sampling portion that both the light and the electromagnetic field pass through. The detector comprises a sensor unit, located on the outer surface of the container corresponding to the location of the sampling portion, and a body to support the sensor unit. The sensor unit generates a first sensing signal to sense light and a second sensing signal to sense the electromagnetic field.

Embodiments of the present invention may also include a display panel that converts the backlight to an information image.

In different embodiments, the sampling portion of the container can be defined as an empty hole or have insulating material such as glass and/or resin.

According to one aspect of the present invention, any malfunction, defect, or abnormality in a light source is detected in real time. The detection of a malfunctioning or defective lamp or lamps prevents driving voltages to be sent to the malfunctioning or defective lamp or lamps. As a result, the rest of the light sources are protected from damage, such as overcharging, and causing damage, such as a fire.

Therefore, if one or more light sources malfunction, the present invention protects the remaining light sources from malfunctioning or damaging the display.

This invention will be more fully understood in light of the following detailed description taken together with the accompanying drawings.

BRIEF DESCRIPTION OF THE DRAWINGS

Like reference numerals are used to identify like elements illustrated in one or more of the figures.

DESCRIPTION OF THE PREFERRED EMBODIMENTS

Backlight Assembly

The First Embodiment

Figure 1:
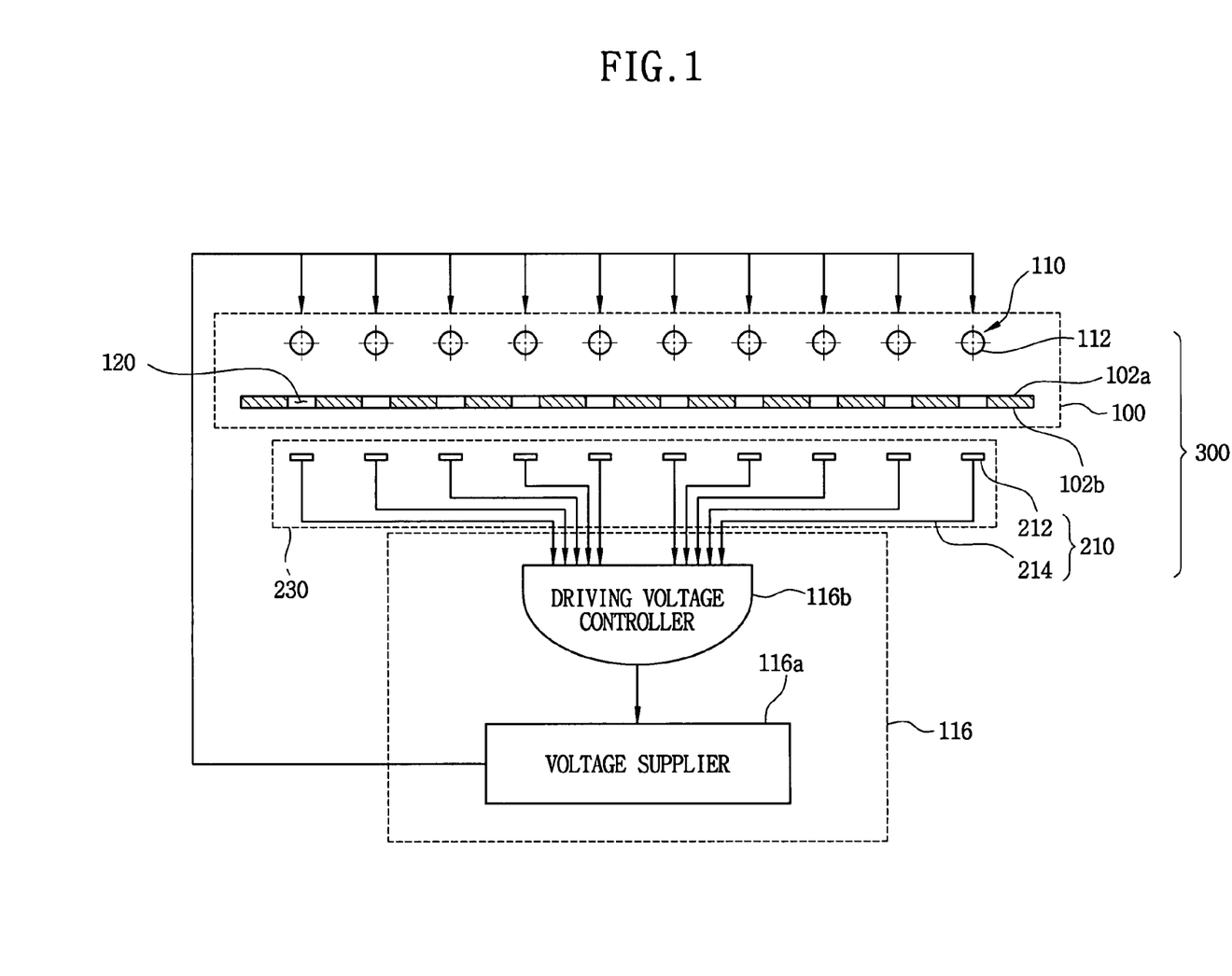
FIG. 1 is a cross-sectional view of a backlight assembly according to a first embodiment of the present invention.
Figure 2:
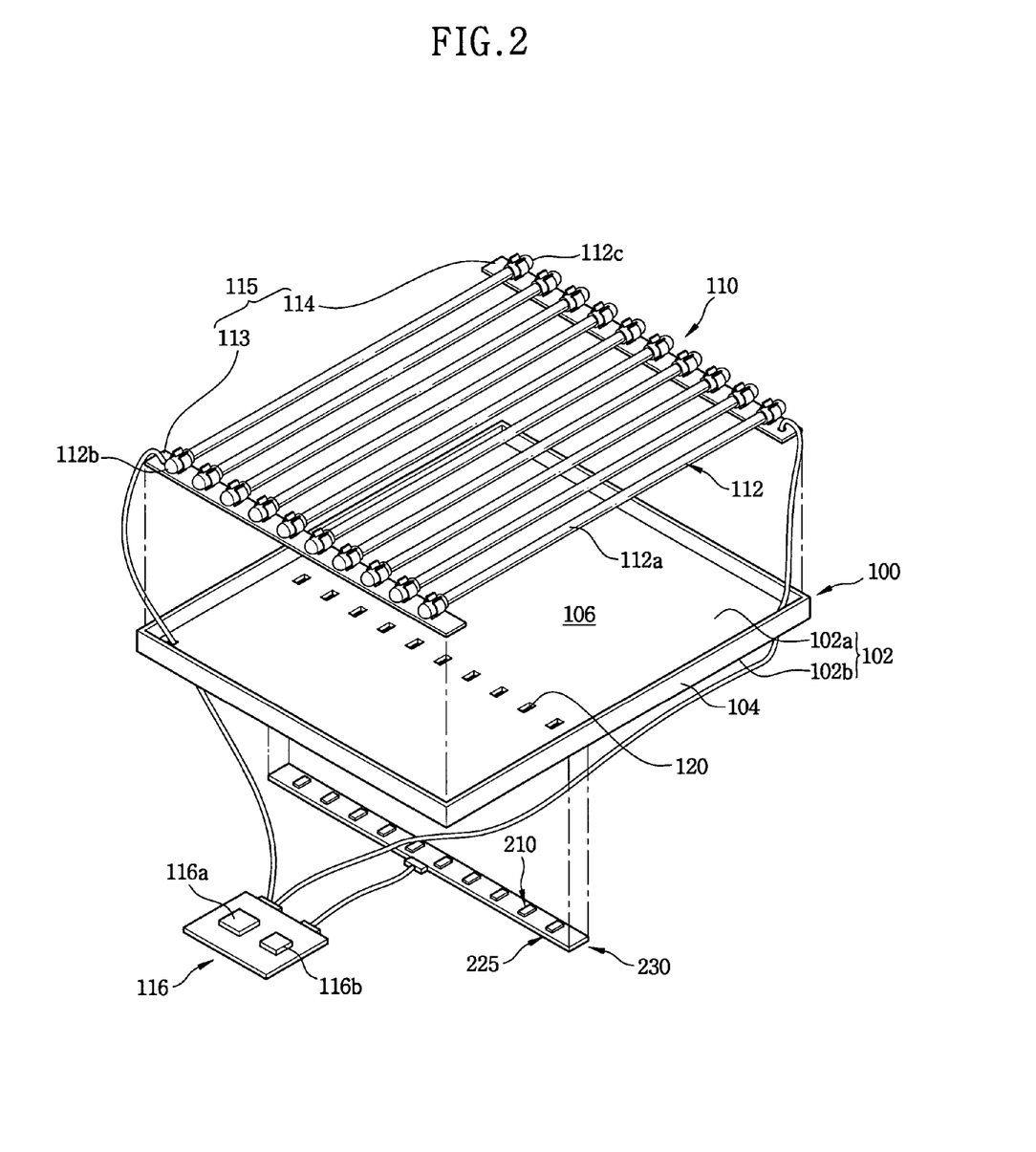
FIG. 2 is an exploded perspective view of the backlight assembly of FIG. 1.

FIG. 1 is a cross-sectional view of the backlight assembly of a first embodiment of the present invention. FIG. 2 is an exploded perspective view of the backlight assembly of FIG. 1. Referring to FIGS. 1 and 2, a backlight assembly 300 comprises a container 100 and a detector 230. The container 100 holds a light and electromagnetic field generating light source 112 and includes sampling holes 120 that the light and/or electromagnetic field can pass through.

Referring to FIG. 2, container 100 comprises a bottom plate 102 and side walls 104. The bottom plate 102 is square and supports light source 112. Therefore, bottom plate 102 comprises a first surface 102a, a second surface 102b, and four lateral surfaces joined to each of the four side walls 104. In the first embodiment, the first surface 102a is the inner surface of the bottom plate 102, and the second surface 102b is the outer surface of the bottom plate 102. The bottom plate 102 is made of light and electromagnetic field blocking material, such as metal, to stop the light and electromagnetic field passing through the solid portions.

The side wall 104 is projected from edges of the bottom plate 102 and defines a holding area 106. The side walls 104 may be made of the same metal as the bottom plate 102, although different materials may also be suitable. For defining holding area 106, each of the side walls 104 may be extended along the same direction from the edge of the bottom plate 102.

Sampling holes 120 are defined in the bottom plate 102 of the container 100. The location of sampling holes 120 correspond to the location of light sources for passing light and electromagnetic field efficiently to the outside of the container. Preferably, the sampling holes 120 are vertically overlapped with the light source 112. In the present embodiment, the sampling holes 120 are penetrating holes formed in the bottom plate 102. However, for preventing the passage of unwanted foreign substances, the sampling holes may be sealed. For example, the sampling holes 120 can be filled with insulating substances such as glass and/or resin that allow light and electromagnetic fields to pass, but block foreign substances. Consequently, a portion of the light and electromagnetic field passes through the sampling hole 120 and any unwanted foreign elements are blocked by the container 100.

The light source 112, held in the holding area 106 of the container 100, and a power impression module 115 forms a light generating apparatus 110.

In the present embodiment, the light source 112 may be a lamp, such as a CCFL (Cold Cathode Fluorescent Lamp), which has electrodes at the inside and/or the outside of the light source 112. Lamp 112 can be located above the bottom plate 102 of the container 100 with a parallel relation to each other.

In this embodiment, each lamp 112 comprises a body 112a, a first external electrode 112b, and a second external electrode 112c. The body 112a of the lamp 112 comprises a circular electrical discharge space, filled with discharge gas, and an inner wall, coated with fluorescent material. Once different voltages are charged to each electrode, the gas is discharged by the electric field between the electrodes. Afterward, the discharge brings invisible rays which are later converted to visible rays.

The first external electrode 112b and the second electrode 112c are located on the surface of the lamp body 112a and save electrical power consumption by lowering the level of discharging voltage. Once voltage is impressed between the first external electrode 112b and the second external electrode 112c, electrical discharge commences in the discharging area and invisible rays start to be emitted.

During the operation of the lamp 112, light and an electromagnetic field are produced within the surrounding space of the lamp 112.

Power impression module 115 includes a first power impression module 113, a second power impression module 114, and an inverter 116. The first power impression module 113 and the second impression module 114 are respectively connected to the first external electrode 112b and the second external electrode 112c of the lamp 112 in either series or parallel.

Inverter 116 comprises a power impression circuit 116a and a driving circuit controller 16b. Power impression circuit 116a impresses the first and second driving voltages to the first and second power impression modules 113 and 114, respectively. For the impression of the discharge, the voltage difference between the first driving voltage and the second driving voltage is greater than the threshold voltage.

The driving circuit controller 116b detects each lamp's operating status and disconnects the first and the second driving voltages when one or more of the lamps 112 malfunction(s) or is/are defective. For disconnecting the driving voltage, the detector 230 detects the intensity of the electromagnetic field of the lamp 112 and generates a sensing signal to disconnect the first and second driving voltage, which then prevents the lamps from being charged.

Figure 3:
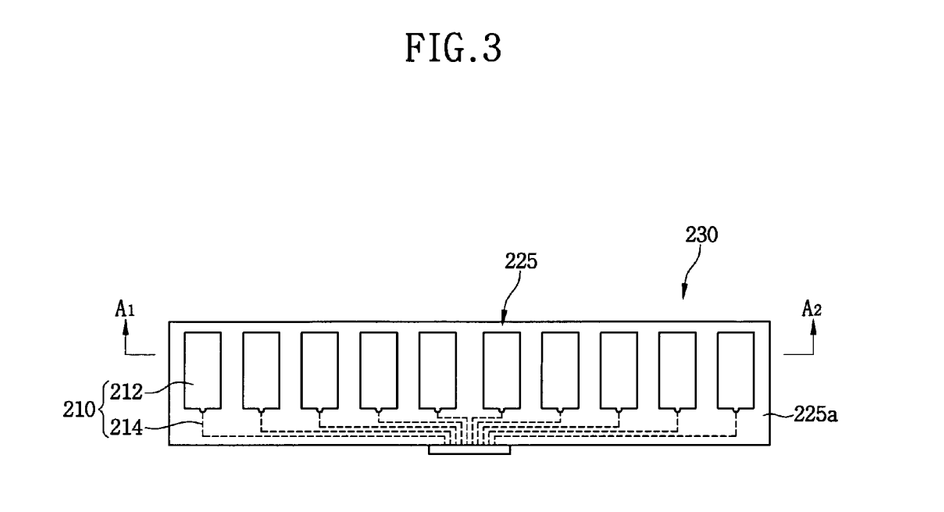
FIG. 3 is a plane view of the first side of a detector shown in FIG. 2.
Figure 4:
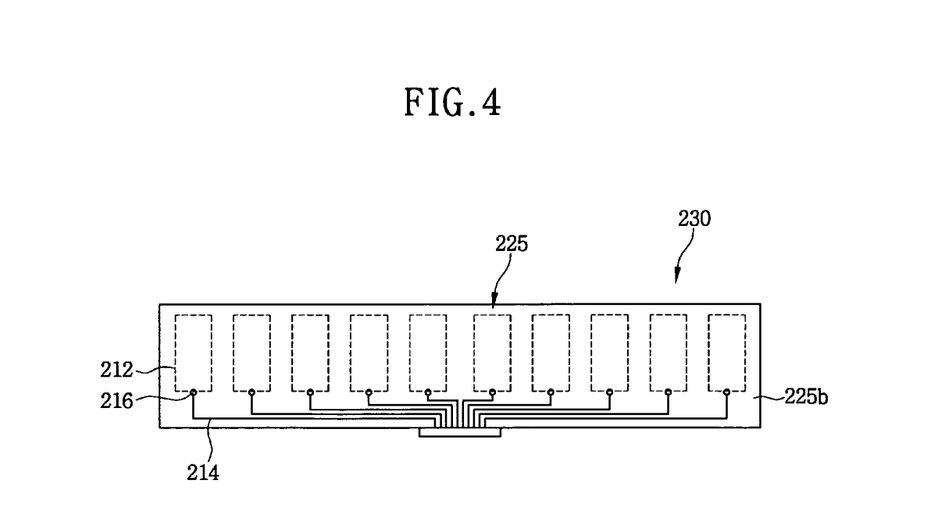
FIG. 4 is a plane view of the second side of the detector shown in FIG. 2.
Figure 5:
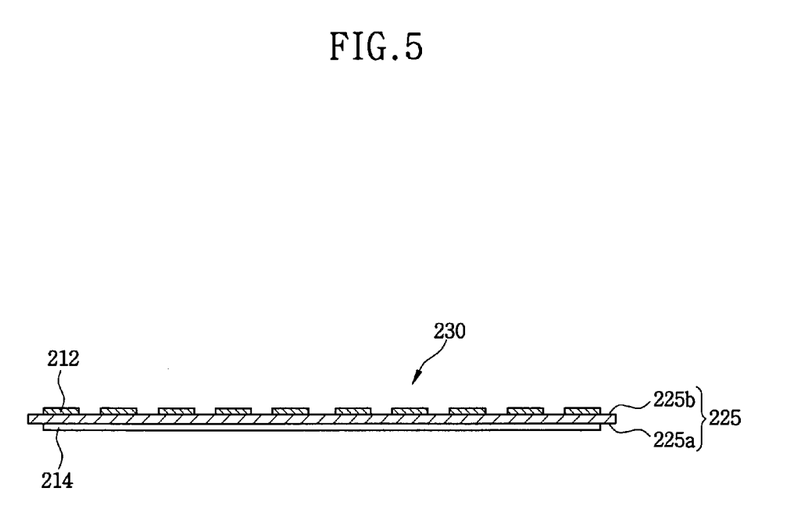
FIG. 5 is a cross-sectional view taken along the line A1-A2 of the detector in FIG. 3.

FIG. 3 is the plane view of a first side of the detector 230 shown in FIG. 2. FIG. 4 is the plane view of a second side of the detector 230 shown in FIG. 2. FIG. 5 is a cross-sectional view of the detector 230 of FIG. 3 along the line A1-A2.

Referring to FIGS. 3-5, detector 230 comprises a body 225 and at least one sensing unit 210. The body 225 comprises an insulating plate such as a PCB (Printed Circuit Board). The body 225 comprises a first side 225a and a second side 225b, which are facing each other.

The sensing unit 210 comprises a conductor 212, which converts an electromagnetic field into current, and a signal output portion 214 which is connected to the conductor 212 and carries out the sensing signal. The conductor 212 is located on the first side 225a of the body, which faces the bottom plate of the container for receiving the electromagnetic field, and the signal output portion 214 is located on the second side 225b of the body, as shown in FIGS. 3 and 4. In the present embodiment, the sensor unit 210 is disposed on the outer surface of the container 100. Alternatively, the sensor unit 210 may be overlapped with the sampling hole 120 so that the sensor unit 210 is disposed in the sampling hole 120. In addition, a portion of the sensor unit 210, which is the conductor 212 may also be overlapped with the sampling hole 120, and a remaining portion of the sensor unit 210 may be disposed on the outer surface of the container 100.

In the present embodiment, the conductor 212 comprises a copper film pattern. Meanwhile, the signal output portion 214 comprises a copper line pattern. The signal output portion 214 can comprise aluminum, iron, tungsten, or any other suitable material. The signal output portion 214 and conductor 212 can be formed on the same side of the body in alternate embodiments. The conductor 212 and signal output portion 214 are electrically connected to each other through a via hole 216 formed on or through the body 225. In the case where the detector comprises a plurality of conductors 212 and a plurality of signal output portions 214, conductors 212 and signal output portions 214 are electrically connected one-by-one through the via holes. Furthermore, the output signal portion can accompany an auxiliary signal wire.

Referring to FIG. 2, the electromagnetic field, generated from the lamps 112 within the container, reaches the sensing unit of the detector 230, which is at least partially overlapped with the sampling portion 120 and located in a corresponding position to the lamps 112. Once the electromagnetic field reaches to the sensing unit 210, the sensing unit 210 converts the electromagnetic field to an electrical sensing signal. The converted sensing signal is sent to the driving circuit controller 116b via signal output portion 214. The driving circuit controller 116b compares each of the sensing signals to a reference signal. If one of the sensing signals is less than the reference signal, the driving circuit controller 116b generates and transmits a controlling signal to the power impression circuit 116a for disconnecting the electrical connection to the first and the second driving signals. As a result, no driving voltage is supplied to the first and second power impression portions 113 and 114, and lamps 112 are not charged.

Figure 6:
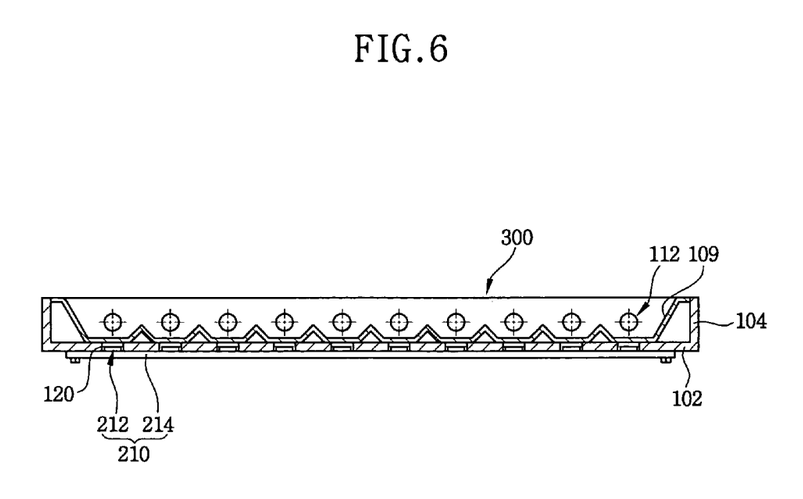
FIG. 6 is a cross-sectional view of the backlight assembly of the FIG. 2.

FIG. 6 is a cross-sectional view of the backlight assembly shown in FIG. 2. Referring to FIG. 6, the container 100 further comprises a reflector 109 which elevates luminescence by reflecting light emitted from the lamps 112.

According to the present embodiment, the location of sensing units 210 correspond to the lamps 112 and sampling portions for detecting the electromagnetic field emitted from the lamps. Consequently, if at least one of the lamps malfunctions or becomes defective, the circuit driving controller 116b disconnects the electrical connection to the malfunctioning lamp for protecting the remaining normal lamps from overcharging and causing damage to the lamps or display.

The Second Embodiment

Figure 7:
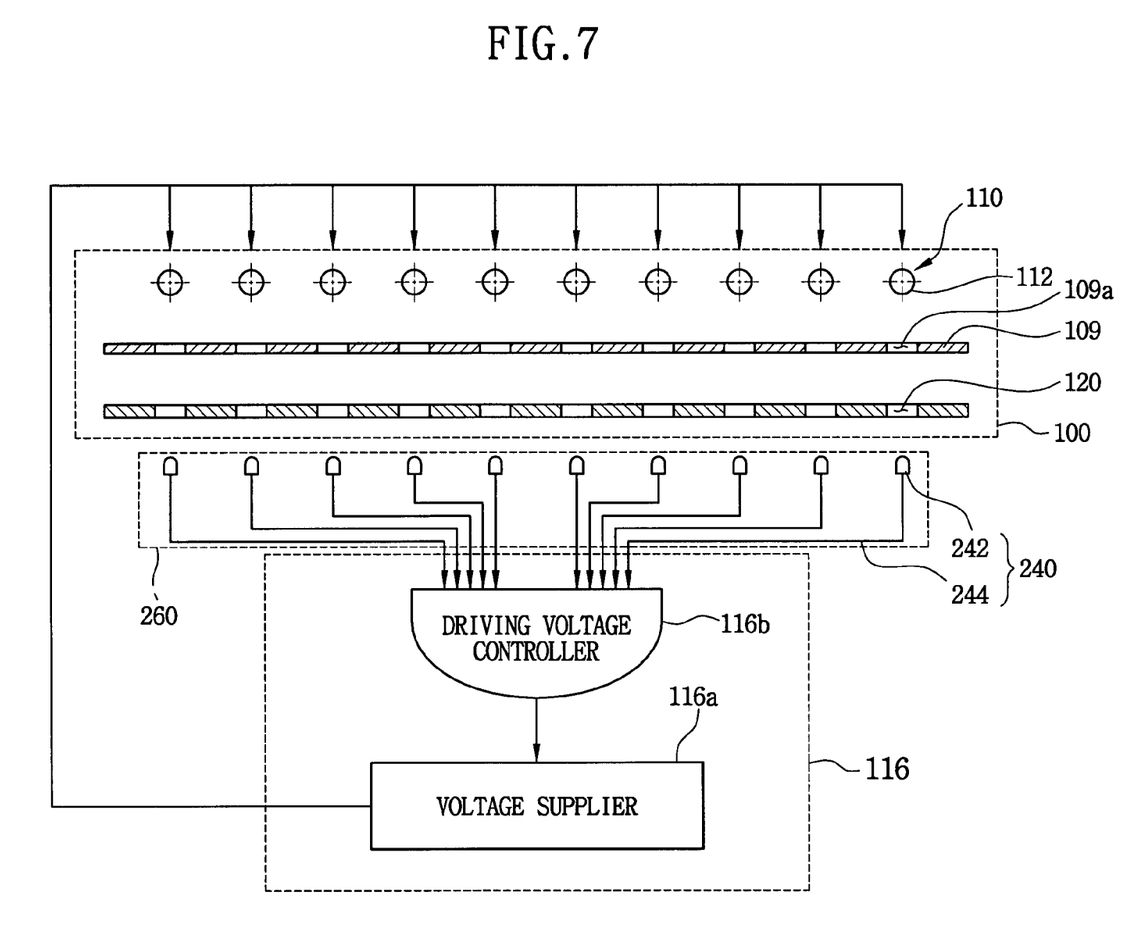
FIG. 7 is a cross-sectional view of a backlight assembly according to a second embodiment of the present invention.

FIG. 7 is a cross-sectional view of a backlight assembly according to a second embodiment of the present invention. The second embodiment is similar to the first embodiment except with a different detector, which detects light instead of an electromagnetic field. Referring to FIG. 7, a detector 260 detects the light emitted from the lamps 112 and generates a sensing signal that disconnects the first and second driving voltage of the power impression circuit 116a.

The detector 260 comprises a light sensing unit 240. In this embodiment, detector 260 generates the sensing signal in accordance with the light emitted from the lamps 112. The light sensing unit 240 comprises a light sensor 242, such as a photo transistor and/or a photo diode, and a signal output portion 244 for transmitting the sensing signal of the light sensor 242. Inverter 116 impresses the light sensor driving signal to the light sensor 242 for operation.

The light, emitted from the lamps 112 inside of the container 100, is illuminated to the light sensing unit 240, placed correspondingly to the location of the each of the lamps 112. Afterwards, light sensing unit 240 generates a sensing signal that is transmitted to the driving circuit controller 116b via signal output portion 244. The driving circuit controller 116b compares each of the sensing signals to the predetermined reference signal. If at least one of the sensing signals is less than the reference signal, the driving circuit controller 116b transmits a control signal to power impression circuit 116a for disconnecting the first and second driving signal of the lamps.

The container 100 can further comprise reflector 109 which elevates luminescence by reflecting the lamp light. The reflector 109 comprises openings 109a at the corresponding location to the sampling holes 120 for transmitting light to light sensing unit 240.

According to the present embodiment, light sensing unit 240, located correspondingly to the lamps, detects light emitted from the lamps 112. Therefore, in the case where a lamp malfunctions or becomes defective, the power impression portion halts the transmission of the driving voltage to the lamps, and therefore, protects the remaining lamps and prevents possible fire.

The Third Embodiment

Figure 8:
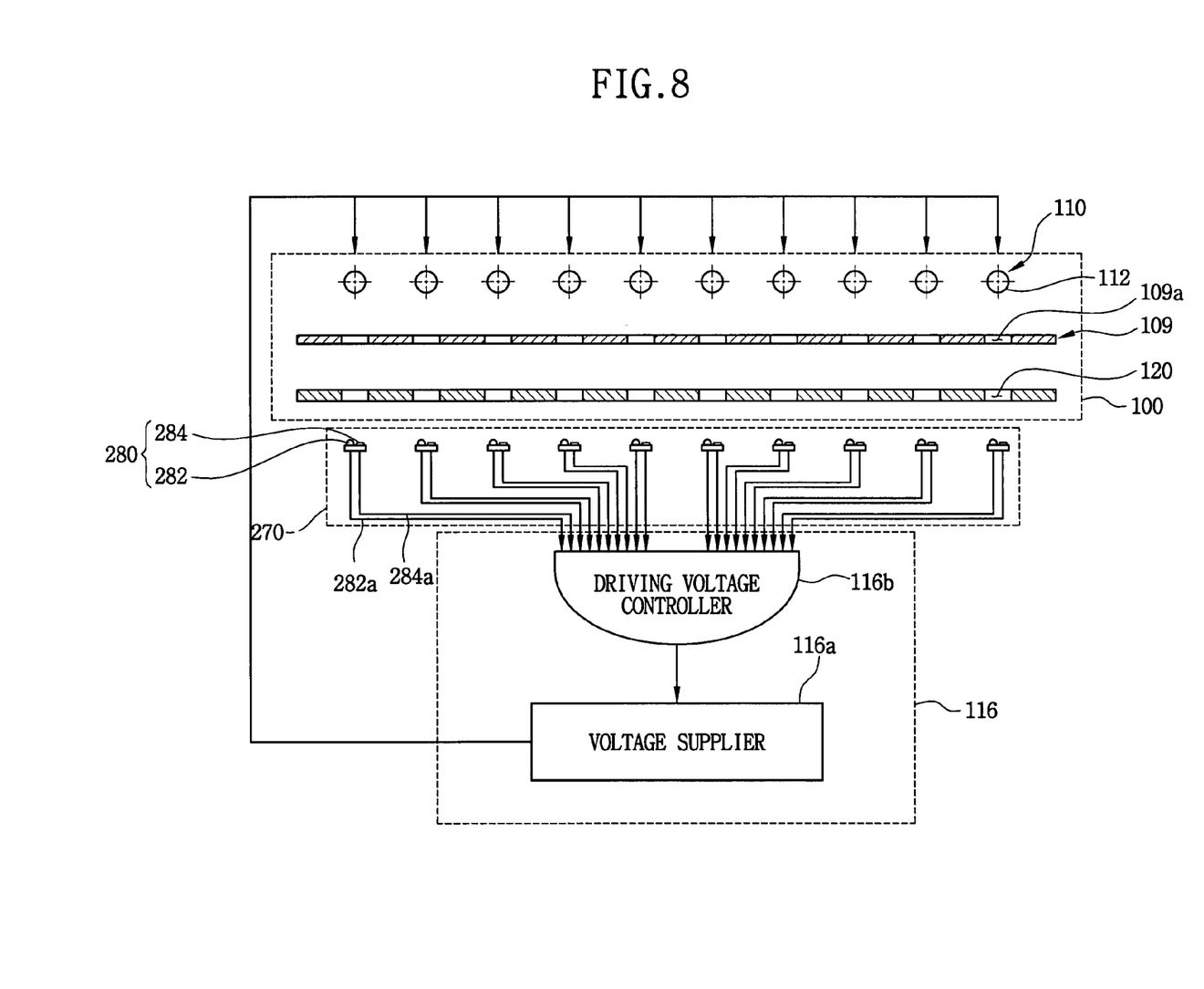
FIG. 8 is a cross-sectional view of a backlight assembly according to a third embodiment of the present invention.

FIG. 8 is a cross-sectional view of a backlight assembly according to a third embodiment of the present invention. The third embodiment is similar to the first embodiment except with a different detector, which detects both light and the electromagnetic field, instead of just one or the other.

Referring to FIG. 8, a detector 270 detects both the light and electromagnetic field emitted from the lamps 112 and generates first and second sensing signals that disconnect the first and second driving voltage that drives lamps.

The detector 270 comprises a sensing unit 280 which has a first sensing portion 282 and a second sensing portion 284. Both the first sensing portion 282 and the second sensing portion 284 are located on the body of the sensing unit 280.

The first sensing portion 282 generates the first sensing signal that is dependent on the intensity of the light of the lamps. In this embodiment, the first sensing portion comprises a photo transistor and/or photo diode. Each of the first sensing portions is connected to a first signal wiring 282a which is connected to the driving circuit controller 116b.

The second sensing portion 284 generates the second sensing signal that is dependent on the intensity of the electromagnetic field of the lamps. The second sensing portion is connected to a second signal wiring 284a.

The driving circuit controller 116b discontinues the first and the second lamp driving current according to the first or the second sensing signal of the first and/or the second sensing portion 282, 284.

Each lamp 112 emits the light and generates the electromagnetic field through the sampling hole 120 to the first and the second sensing portions which is formed according to the location of the lamps to receive the light and the electromagnetic field sufficiently and efficiently. The first and the second sensing portions convert the light and the electromagnetic field, respectively, to the first and the second sensing signal. The sensing signals are then transmitted to the driving circuit controller 116b via the first and second signal wirings 282a, 284a. The driving circuit controller 116b compares the sensing signals to predetermined reference signals. If one of the sensing signal currents is less than the corresponding reference signal, the driving circuit controller 116b transmits a controlling signal to power impression circuit 116a to hold the first and second driving voltage given to the malfunctioning or defective lamps.

The container 100 can further comprise reflector 109 which elevates luminescence by reflecting the lamp light. The reflector 109 comprises openings 109a at the corresponding location to the sampling holes 120 for transmitting light and electromagnetic field to the first and second sensing unit 282, 284.

According to the present embodiment, the first and the second sensing units 282 and 284, at a corresponding location to the lamps, detect the light and the electromagnetic field emitted from the lamps 112. Therefore, in the case where a lamp malfunctions or becomes defective, power impression circuit 116a holds the transmittance of driving voltage to the lamps, and therefore, protects the other lamps and prevents possible fire.

The Fourth Embodiment

Figure 9:
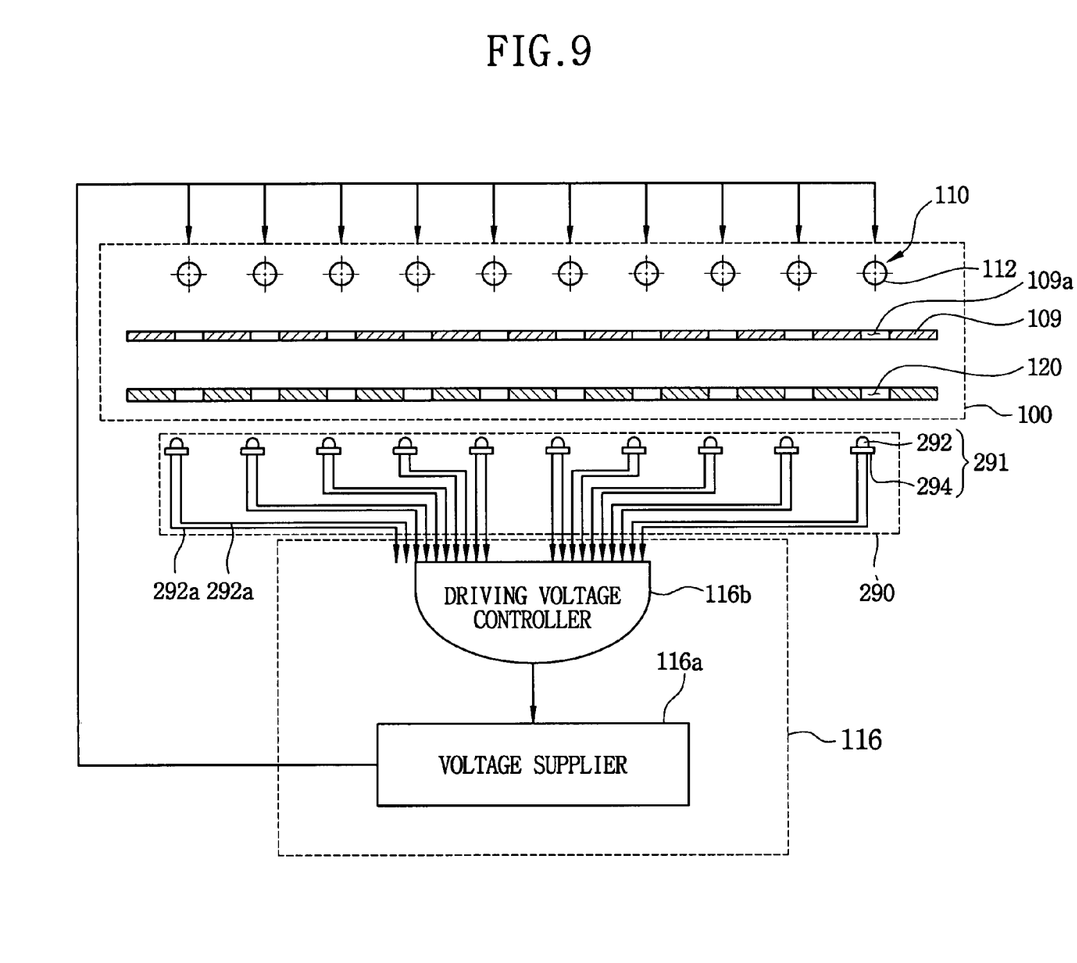
FIG. 9 is a cross-sectional view of a backlight assembly according to a fourth embodiment of the present invention.

FIG. 9 is a cross-sectional view of a backlight assembly according to a fourth embodiment of the present invention. The fourth embodiment is similar to the third embodiment except with a different sensing unit.

Referring to FIG. 9, a detector 290 detects both the light and the electromagnetic field emitted from the lamps 112 and generates first and the second sensing signals that disconnect the first and the second driving voltage that drives the lamps.

The detector 290 comprises a sensing unit 291 which has a first sensing portion 292 and a second sensing portion 294. The second sensing portion 294 forms the bottom portion of the sensing unit 291, while the first sensing portion 292 is located on the second sensing portion 294 or vice versa. Furthermore, if the detector 290 comprises more than one of the sensing units 291, the second sensing portions 294 are located side by side along with the lamps' location, and the first sensing portions 292 are located on each of the second sensing portions 294 or vice versa.

The first sensing units 292 generate the first sensing signal dependent on the amount of light detected from the lamps 112. A first sensing signal wiring 292a connects the first sensing unit 292 to the driving circuit controller 116b.

The second sensing units 294 generate the second sensing signal dependent on the strength of the electromagnetic field detected from the lamps 112. A second sensing signal wiring 294a connects the second sensing unit 294 to the driving circuit controller 116b.

Thus, the present embodiment differs from the previous one in that the first and second sensing units are stacked rather than place side by side, which makes the sensing unit more compact.

Display Device

Figure 10:
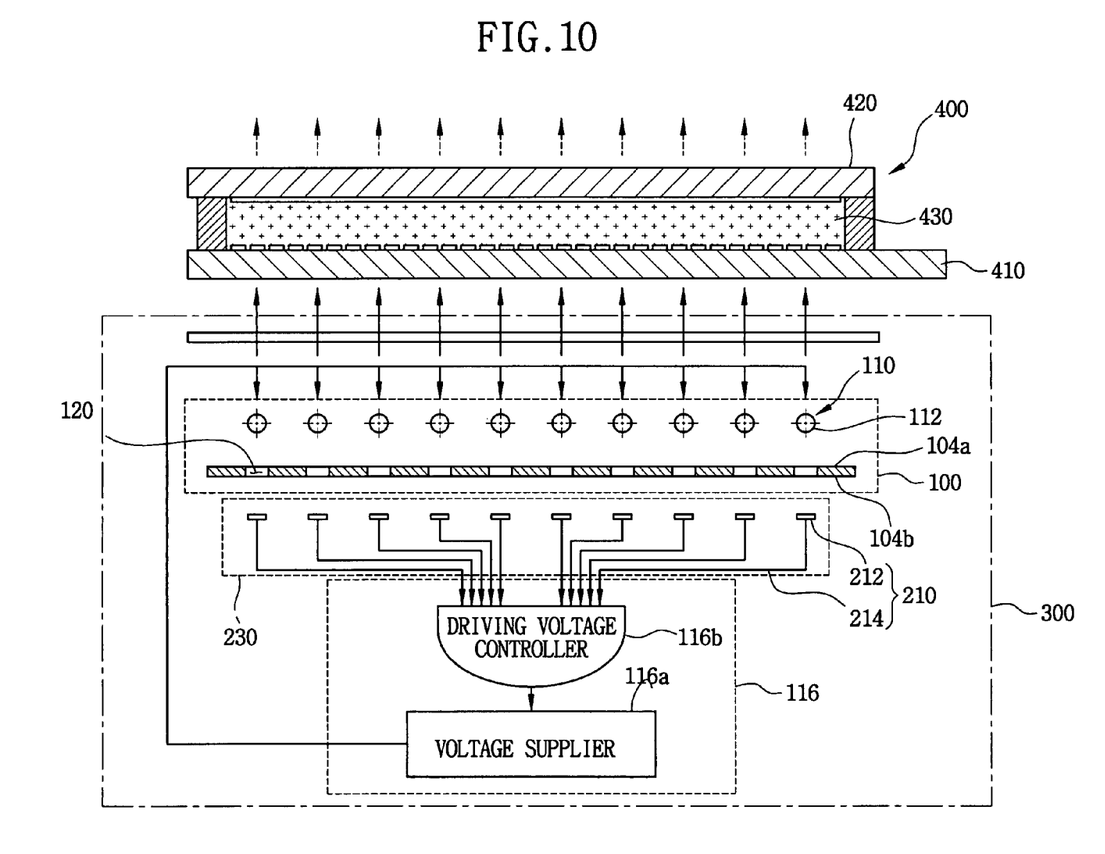
FIG. 10 is a cross-sectional view of a display device according to a fifth embodiment of the present invention.

FIG. 10 is a cross-sectional view of a display device according to a fifth embodiment. Because the present embodiment may share the same backlight assembly with the first through fourth embodiments, duplicated descriptions are omitted.

Referring to FIG. 10, a display device 500 comprises a backlight assembly 300 and a display panel 400. The display panel 400 receives light from backlight assembly 300 and converts the light to an information image.

Display panel 400 comprises a TFT (thin film transistor) substrate 410, a liquid crystal layer 430, and a color filter substrate 420.

Figure 11:
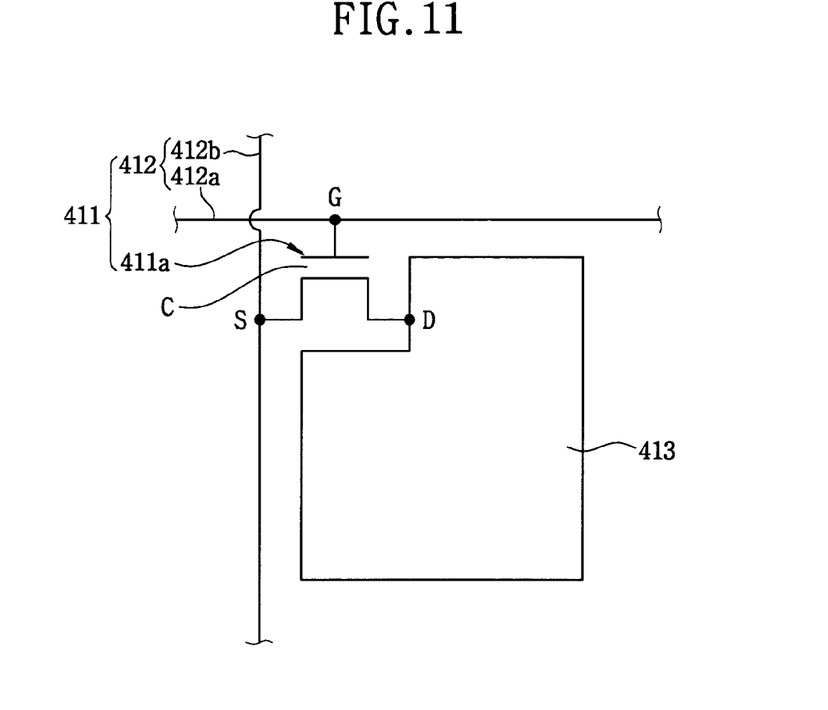
FIG. 11 is a partial plane view showing a portion of the TFT substrate of the display device of FIG. 10.

FIG. 11 is a partial plane view showing a portion of the TFT substrate 410 of the display device of FIG. 10. Referring to FIG. 11, TFT substrate 410 comprises a pixel electrode 413 and a current transmission portion 411 for transmitting current to the pixel electrode 413. The TFT substrate 410 may have a plurality or array of current transmission portions 411 and pixel electrodes 413.

The plurality of pixel electrodes 413 are formed on the TFT substrate in matrix array and can be made of thin film pattern of Indium Tin Oxide (ITO), Indium Zinc Oxide (IZO), or any suitable material or combination of materials.

The current transmission portion 411 comprises a thin film transistor 411a and a driving wire 412. The driving wire 412 comprises a gate signal wire 412a and a data signal wire 412b which intersect each other and are electrically separated from each other, such as by an insulator.

Thin film transistor 411a is electrically connected to the gate signal wire 412a and the data signal wire 412b. In detail, thin film transistor 411a comprises a gate electrode G, a source electrode S, a channel region C, and a drain electrode D. The channel is located above the gate electrode with an insulator in between. The channel region C is electrically connected to the source electrode and drain electrode, while the source electrode and the drain electrode are respectively electrically connected to the data signal wire 412b and pixel electrode 413.

In operation, data signal wire 412b is charged with a pixel voltage while gate signal wire 412a is charged with a driving voltage, which is higher than the threshold voltage for converting the channel region from insulator to conductor. Ultimately, the pixel voltage is charged to the pixel electrode via channel region C and drain electrode D. If TFT substrate 410 comprises a plurality of pixel electrodes 413, each pixel electrode 413 receives different levels of pixel voltage for showing the information image.

Figure 12:
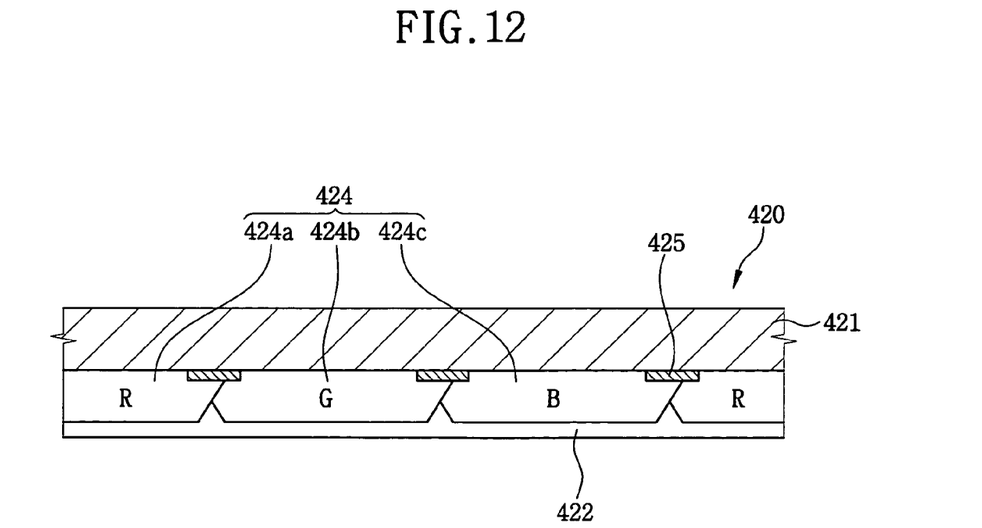
FIG. 12 is a cross-sectional view of the color filter substrate of the display device of FIG. 10.

FIG. 12 is a cross-sectional view of the color filter substrate 420 of the display device of FIG. 10. Referring to FIG. 10, color filter substrate 420 and TFT substrate are facing each other. Color filter substrate 420 comprises a transparent plate 421, black matrix 425, a color filter 424, and a common electrode 422. Black matrix 425 is formed on the transparent plate 421 and color filter 424 is formed on the black matrix 425 and confronts the pixel electrode of the TFT substrate. Color filter 424 comprises red 424a, green 424b, and blue 424c color resin with black matrix 425 in between for blocking the unnecessary light. Common electrode 422, which can be made of transparent material such as Indium Tin Oxide (ITO) or Indium Zinc Oxide (IZO), is formed on the transparent plate 421 and overlapped with color filter 424 and black matrix 425 and confronts pixel electrode 413.

Referring back to FIG. 10, liquid crystal layer 430 comprises a plurality of liquid crystal molecules and is disposed between the color filter substrate 420 and the TFT substrate 410. Each of the liquid crystal molecules changes its light direction according to the electric field charged between pixel electrode 413 of the TFT substrate 410 and common electrode 422 of the color filter substrate 420. The change of liquid crystal molecules' light direction in the liquid crystal layer alters the transmittance of the backlight and therefore, backlight can be converted to information image.

A driving circuit module impresses signals to the gate wires 412a and the data wires 412b for driving liquid molecules by charging pixel electrode 413.

As described above in detail, the container 100 comprises light sources and detectors located on the outer space of the container that detect the light and/or the electromagnetic field through sampling holes. The detector generates sensing signals dependent on the light and/or electromagnetic field detected and holds a lamp driving voltage when a malfunctioning or defective lamp is detected for protecting the other lamps and preventing fire.

The above-described embodiments of the present invention are merely meant to be illustrative and not limiting. It will thus be obvious to those skilled in the art that various changes and modifications may be made without departing from this invention in its broader aspects. Therefore, the appended claims encompass all such changes and modifications as fall within the true spirit and scope of this invention.

What is claimed is:

1. A backlight assembly, comprising:
   at least one energy source;
   a container having disposed therein the energy source wherein the container includes a sampling portion associated with the energy source, the sampling portion being adapted to allow passage of energy from the energy source to an exterior of the container;
a sensor unit associated with the sampling portion, wherein the sensor unit generates a sensing signal that is a function of an amount of energy detected; and
a driving module which is electrically connected to the energy source, the driving module being adapted to disrupt the electrical connection to the energy source if a magnitude of the sensing signal is less than a predetermined reference.

2. The backlight assembly of claim 1, wherein the energy emitted by the energy source is selected from the group consisting of light and an electromagnetic field.

3. The backlight assembly of claim 1, wherein the sampling portion comprises a sampling hole formed in the container.

4. The backlight assembly of claim 3, wherein the sampling portion further comprises insulating material within the sampling hole.

5. The backlight assembly of claim 1, wherein the sensor unit comprises a conductive layer and a signal output portion electrically connected to the conductive layer.

6. The backlight assembly of claim 5, wherein the backlight assembly further comprises a body supporting the sensor unit, and wherein the conductive layer and the signal output portion of the sensor unit comprises metal.

7. The backlight assembly of claim 5, wherein the conductive layer and the signal output portion is selected from the group consisting of copper, aluminum, iron and tungsten.

8. The backlight assembly of claim 1, wherein the container is made of an electromagnetic field blocking material.

9. The backlight assembly of claim 8, wherein the electromagnetic field blocking material is metal.

10. The backlight assembly of claim 1, further comprising a reflector located in the container between an inner surface of the container and the energy source.

11. The backlight assembly of claim 1, wherein the driving module comprises an inverter adapted to provide a driving voltage to the energy source and adapted to interrupt application of the driving voltage to the energy source if the magnitude of the sensing signal is less than a the predetermined reference.

12. The backlight assembly of claim 1, wherein the energy source is adapted to emit a combination of both light and an electromagnetic field.

13. A backlight assembly, comprising:
at least one energy source;
a container having disposed therein the energy source wherein the container includes a sampling portion associated with the energy source, the sampling portion comprising a sampling hole in a wall of the container;
a detector comprising a sensor unit disposed at the sampling hole and a body disposed on the wall of the container that supports the sensor unit, wherein the sensor unit generates a sensing signal that is a function of an amount of energy; and
a driving module which is electrically connected to the energy source, the driving module being adapted to disrupt the electrical connection to the energy source if a magnitude of the sensing signal is less than a predetermined reference.

14. The backlight assembly of claim 13, wherein the energy emitted by the energy source includes light and an electromagnetic field.

15. The backlight assembly of claim 13, wherein the energy source is adapted to emit a combination of both light and an electromagnetic field.

16. A backlight assembly, comprising: at least one light source; a container containing the light source which generates light, the container comprising a sampling portion associated with the light source which passes the light generated from the light source;
a detector disposed on an exterior of the container and having a sensor unit, wherein the sensor unit generates a sensing signal that is a function of the amount of light generated from the light source;
a driving module which is electrically connected to the energy light source, the driving module being adapted to disrupt the electrical connection to the light energy source if a magnitude of the sensing signal is less than a predetermined reference; and
a reflector disposed between the light source and an inner surface of the container, the reflector having an opening aligned with the sampling portion to pass light from the light source to the sensor unit.

17. The backlight assembly of claim 16, wherein the sensor unit comprises a phototransistor or a photodiode.

18. A backlight assembly, comprising:
a light source which emits light and generates an electromagnetic field;
a container having disposed therein the light source, wherein the container includes a sampling portion associated with the light source, the sampling portion being adapted to pass the light and the electromagnetic field;
a detector disposed on an exterior of the container and having a sensing unit which is reactive to the light and the electromagnetic field; and
a driving module which is electrically connected to the light source, the driving module being adapted to disrupt the electrical connection to the light source if a magnitude of the sensing signal is less than a predetermined reference.

19. The backlight assembly of claim 18, further comprising a reflector disposed between the light source and the container, the reflector including a hole associated with the location of the sampling portion for passing the light and the electromagnetic field.

20. The backlight of claim 18, wherein the sensing unit comprises a first sensing portion reactive to the light of the light source and a second sensing portion reactive to the electromagnetic field, wherein the first sensing portion and the second sensing portion are located side by side.

21. The backlight of claim 18, wherein the sensing unit comprises a light sensitive first sensing portion and an electromagnetic field sensitive second sensing portion, wherein the first sensing portion and the second sensing portion overlap.

22. A backlight assembly, comprising:
a container having a light and electromagnetic field generating source and a sampling portion associated with the light and electromagnetic field generating source which passes the light and electromagnetic field;
a detector having a sensor unit that overlaps with the sampling portion, wherein the sensor unit includes a light sensing portion and an electromagnetic field sensing portion, wherein the light sensing portion generates a first sensing signal that is a function of the intensity of the light and the electromagnetic field sensing portion generates a second sensing signal that is a function of the intensity of the electromagnetic field; and
an inverter coupled to the light and electromagnetic field generating source, the inverter being adapted to provide a driving voltage to the light and electromagnetic field generating source, wherein the inverter is further adapted to interrupt application of the driving voltage to the light and electromagnetic field generating source if the magnitude of the first sensing signal is less that a first predetermined reference or if the magnitude of the second sensing signal is less than a second predetermined reference.

23. A backlight assembly, comprising:
a light source;
a container having disposed therein the light source wherein the container includes a light passing portion associated with the light source;
a detector disposed on the an exterior of the container and associated with the light passing portion wherein the detector includes a light reactive and sensing signal current producing unit and a body; and
a driving module coupled to the light source and the detector, the driving module being adapted to provide voltage to the light source, is adapted to cease application of the voltage to the light source if the sensing signal current is less than a predetermined reference.

24. A display device, comprising:
a backlight assembly comprising a light and electromagnetic field generating apparatus;
a container for receiving the light and electromagnetic field generating apparatus;
a detector; and
a display panel which converts light from the backlight assembly to an information image, wherein the detector is located at the exterior of the container and includes a sensor unit which is reactive to the electromagnetic field and a body to support the sensor unit; and
a driving module which is electrically connected to the light and electromagnetic field generating apparatus, the driving module being adapted to disrupt the electrical connection to the light and electromagnetic field generating apparatus if a magnitude of the sensing signal is less than a predetermined reference.

25. The display device of claim 24, wherein the display panel comprises a first substrate having a first electrode, a second substrate having a second electrode, and a liquid crystal layer being operative to the first electrode and the second electrode.

26. A method of operating a backlight assembly comprising a plurality of light sources, the method comprising:
passing energy through sampling portions associated with each of the plurality of light sources;
measuring the energy from each of the plurality of light sources;
comparing the measured energy with a reference value;
determining whether a light source is malfunctioning based on the comparison; and
preventing the malfunctioning light source from being charged.

27. The method of operating the backlight assembly of claim 26, wherein the energy emitted by the light source is selected from the group consisting of light and an electromagnetic field.

28. The method of operating the backlight assembly of claim 26, wherein the energy source is adapted to admit a combination of both light and an electromagnetic field.

* * * * *